(12) United States Patent  
Fong et al.

(10) Patent No.: US 7,870,560 B2
(45) Date of Patent: Jan. 11, 2011

(54) METHOD OF RECEIVING A MESSAGE PROCESSABLE BY A COMPONENT ON ONE OF PLURALITY OF PROCESSING THREADS

(75) Inventors: Pamela H Fong, Palo Alto, CA (US); Simon A J Holdsworth, Andover (GB)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/764,353

(22) Filed: Jun. 18, 2007

(65) Prior Publication Data

US 2008/0313372 A1    Dec. 18, 2008

(51) Int. Cl.
G06F 13/00    (2006.01)

(52) U.S. Cl. ............... 719/313; 719/312; 719/314; 718/108

(58) Field of Classification Search ................ 719/313, 719/312, 314; 718/108
See application file for complete search history.

(56) References Cited

U.S. PATENT DOCUMENTS

| | | | |
|---|---|---|---|
| 4,823,304 | A | 4/1989 | Frantz et al. |
| 5,553,305 | A * | 9/1996 | Gregor et al. ............... 718/106 |
| 5,802,055 | A | 9/1998 | Krein et al. |
| 6,230,228 | B1 | 5/2001 | Eskandari et al. |
| 6,279,065 | B1 | 8/2001 | Chin et al. |
| 6,301,630 | B1 | 10/2001 | Chen et al. |
| 6,829,766 | B1 * | 12/2004 | Murata ...................... 718/108 |
| 2003/0099254 | A1 | 5/2003 | Richter | |

OTHER PUBLICATIONS

Authors: Herlihy, M. (Dept. Of Comput. Sci., Brown Univ., Providence, RI, USA); Rajsbaum, S.; Tuttle, M.R. Source:Title: Unifying synchronous and asynchronous message-passing models Proceedings of the Seventeenth Annual ACM Symposium on Principles of Distributed Computing, 1998, 133-42 ISBN: 0 89791 977 7 Conference: Proceedings of ACM Symposium on Principles of Distributed Computing, Jun. 28-Jul. 2, 1998, Puerto.

Authors: Budau, V. (Comput. Sci. Dept., Inst. Nat. des Telecommun., Evry, France); Bernard, G. Source: Title: Synchronous/asynchronous switch for a dynamic choice of communication model in distributed systems Proceedings Ninth International Conference on Parallel and Distributed Systems, 2002, 97-102 ISBN: 0 7695 1760 9 Conference: Proceedings of the Ninth International Conference on Parallel and Distributed Systems, Dec. 17-20, 2002.

(Continued)

*Primary Examiner*—Andy Ho
(74) *Attorney, Agent, or Firm*—David A. Mims, Jr.

(57) ABSTRACT

There is disclosed a method, apparatus and computer program product for receiving a message, the message being processable by a component on one of a plurality of processing threads. A message is received from a first component on a current thread. The communication style that was used by the first component is determined. Responsive to receipt of the message, the communication style that is desired to be used by a second component is determined. Responsive to determining that the two components are asynchronous, communication takes place with the second component using the current thread.

20 Claims, 10 Drawing Sheets

OTHER PUBLICATIONS

Authors: Budau, V. (Inst. Nat. des Telecommun., Evry, France); Bernard, G. Source: Title: Auto-adaptation to communication environment through dynamic change of communication model Proceedings 23rd International Conference on Distributed Computing Systems Workshops, 2003, 153-8 ISBN: 0 7695 1921 0 Conference: Proceedings 23rd International Conference on Distributed Computing Systems Workshops, May 19-22.

* cited by examiner

Figure 1a

Thread Switch Table 95

| Caller Async? | Target Component Async? YES | Target Component Async? NO |
|---|---|---|
| YES | Figures 2 (step 140) and 6 (step 540) | Figures 5 and 8 |
| NO | Figures 4 and 9 | Figures 3 and 7 |

Request Processing:
Synchronous caller -> Synchronous target

Reply Processing:
Synchronous caller receives reply from Asynchronous target

METHOD OF RECEIVING A MESSAGE PROCESSABLE BY A COMPONENT ON ONE OF PLURALITY OF PROCESSING THREADS

FIELD OF THE INVENTION

The invention relates to computer based message processing, and more particularly to computer based message processing by a component using a plurality of threads.

BACKGROUND OF THE INVENTION

Messaging systems typically provide the capability for the sender and receiver of messages to execute at different times (asynchronously). The sender does not need to wait for the receiver to be running in order to send a message, and does not need to wait until the receiver has received the message.

In business integration systems, there are typically one or more components inserted between a sender and receiver that are responsible for performing integration functions such as transformation, routing and logging. These components may be Enterprise Service Bus (ESB) mediations, or process engines, for example. These components may be reused in both an asynchronous messaging interaction, and a synchronous invocation interaction.

The messaging applications need to retain the asynchronous nature of their interaction with respect to the overall exchange. Asynchronous interactions are typically much more expensive in processing time and also resource usage to execute than synchronous ones. The problem with existing systems is that each stage of the interaction between the sender and receiver is treated as asynchronous.

SUMMARY OF THE INVENTION

According to a first aspect, there is provided a method for receiving a message, the message being processable by a component on one of a plurality of processing threads, the method comprising: receiving a message from a first component on a current thread; determining the communication style that was used by the first component; responsive to receipt of the message determining the communication style that is desired to be used by a second component; and responsive to determining that the two components are asynchronous, for communicating with the second component using the current thread.

It should be appreciated that for a reply interaction, the communication style that is desired to be used by the second component is preferably the same as the style that component used on the corresponding request interaction. Thus the step of determining in this case may involve retrieving a cached indication of the style previously used.

In one embodiment, a request is received from the first component. Determining the communication style that was used by the first of the message comprises involves determining the invocation style of the first component. Communicating with the second component using the current thread comprises involves invoking the second component using the current thread.

In one embodiment, if it determined in a request interaction that one of the components is synchronous while the other is asynchronous, a thread switch is performed from the current thread on which the request was received to a new thread by dispatching a new thread to continue processing of the request message.

In one embodiment, if it is determined that two components in a request interaction are synchronous, the second component is invoked using the current thread on which the request was received such that the second component's logic can be executed on said thread.

In one embodiment, if it determined that the first component is synchronous and the second component is asynchronous in a request interaction, the request is placed on a queue using the current thread on which the request was received. In this embodiment, the first component waits blocked for a reply to be received on that current thread. In this embodiment, the request is preferably retrieved from the queue using a new thread, for processing by the asynchronous component using that new thread.

In one embodiment, responsive to determining that the first component is asynchronous and the second component is synchronous, the request is placed on a queue using the current thread on which the request was received such that the first component can continue processing on that current thread. In this embodiment, the request is retrieved from the queue using a new thread such that the synchronous second component can start processing the request on that new thread.

In one embodiment, the communication style used by the first component in a request interaction is based on the protocol used by the first component.

In one embodiment, the communication style used by the first component in a request interaction is based information received in the request message at the first component.

In one embodiment, the communication style desired to be used by the second component in a request interaction is based on component implementation information.

In one embodiment, the communication style desired to be used by the second component in a request interaction is based on information received in a message asking for details of the communication style of the second component.

In one embodiment, a reply is received from the first component on a current thread.

In one embodiment, responsive to determining that said first component is asynchronous and the second component to which the reply is to be sent is synchronous, a thread switch is performed from the current thread on which the reply was received to a new thread by dispatching a new thread to continue processing of the reply.

In one embodiment, responsive to determining that the two components in a reply interaction are asynchronous, the reply is passed on the current thread on which the reply was received.

In one embodiment, responsive to determining that the two components in a reply interaction are synchronous, the reply is passed from the first component to the second component on the current thread on which the reply was received.

In one embodiment, responsive to determining that the first component is synchronous and the second component is asynchronous in a reply interaction, the reply is placed on a queue using the current thread on which the reply was received and the current thread is released. In this embodiment, a new thread is dispatched to retrieve the reply from the queue for processing by the asynchronous second component using that new thread.

In one embodiment, responsive to determining that the first component is synchronous and the second component is asynchronous in a reply interaction, and responsive to determining that the thread on which the second component invoked the first component in the corresponding request interaction is available, the reply is passed to the second component on the available thread.

In one embodiment, responsive to determining that said first component is asynchronous and said second component is synchronous in a reply interaction, a blocked thread of the second component is resumed to receive the reply.

In one embodiment, the first and second components are asynchronous. In this embodiment, a transactional boundary may be maintained between the two asynchronous components.

In one embodiment, the execution time of at least one of the first and second components may be taken into account in order to determine whether to perform a thread switch.

In one embodiment, it is possible to customize when a thread switch is to occur based on one or more factors additional to the invocation style of the first component and communication style of the second component.

According to a second aspect, there is provided an apparatus for receiving a message, the message being processable by a component on one of a plurality of processing threads, the apparatus comprising: means for receiving a message from a first component on a current thread; means for determining the communication style that was used by the first component;

means, responsive to receipt of the message, for determining the communication style that is desired to be used by a second component; and means, responsive to determining that the two components are asynchronous, for communicating with the second component using the current thread.

According to a third aspect, there is provided a computer program product for receiving a message, the message being processable by a component on one of a plurality of processing threads, the computer program product comprising computer readable medium having computer instructions operable when run on a computer to perform the steps of: receiving a message from a first component on a current thread; determining the communication style that was used by the first component; responsive to receipt of the message determining the communication style that is desired to be used by a second component; and responsive to determining that the two components are asynchronous, for communicating with the second component using the current thread.

BRIEF DESCRIPTION OF THE DRAWINGS

A preferred embodiment of the present invention will now be described, by way of example only, and with reference to the following drawings.

DETAILED DESCRIPTION

As previously discussed, one or more components may be inserted between a message sending application and a message receiving application. Such messaging applications need to retain the asynchronous nature of their interaction with respect to the overall exchange between end-point systems.

In contrast to the received wisdom that would impose asynchronous processing on each component, it has been appreciated by the inventors that the intermediate components are not necessarily required to be asynchronous. Asynchronous interactions are typically much more expensive (in processing time and resource usage) to execute than synchronous ones. A mechanism is therefore provided which allows the processing between intermediate integration components to be synchronous, while preserving the asynchronous interaction of the overall message exchange between the end-point systems.

Figure 1A:
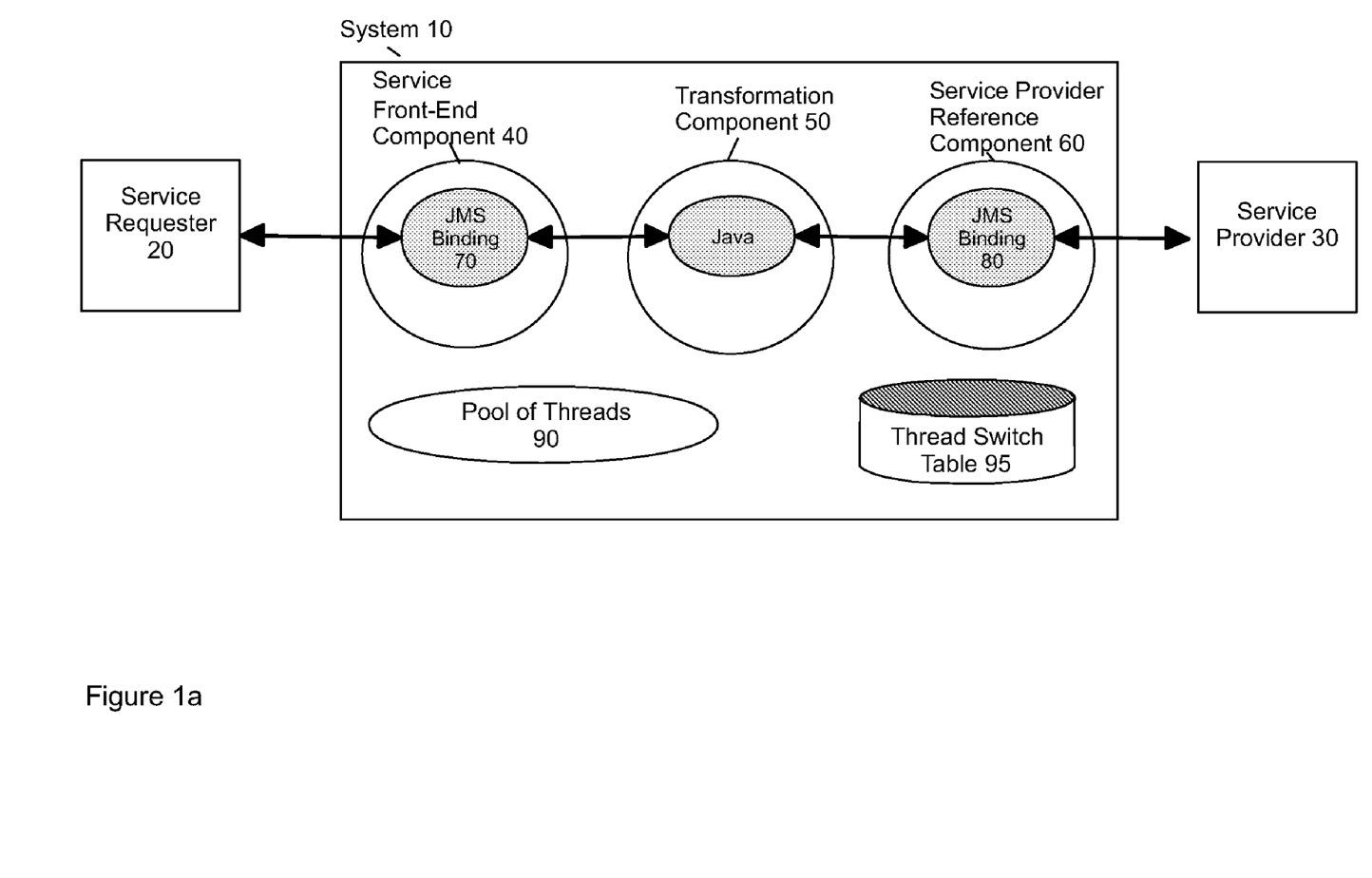
FIG. 1a illustrates a component diagram of a preferred embodiment of the present invention.

FIG. 1 illustrates an overview of a system operable in accordance with the preferred embodiment. A service requester messaging application 20 issues requests to service provider messaging application 30 via intermediate system 10. System 10 comprises a number of components 40, 50, 60. Three components are shown by way of example only and it will of course be appreciated that system 10 could comprise any number of intermediate components.

In the example shown, system 10 comprises a service front-end component 40. This component receives requests from service requester 20 and communicates any responses originated by service provider 30 to requester 20. Such receipt and onward communication from component 40 is enabled by means of a transport binding. In the exemplary embodiment, this binding is a Java™ Message Service (JMS) binding. (Java and all Java-based trademarks and logos are trademarks of Sun Microsystems, Inc. in the United States, other countries, or both.)

Service Front-end component 40 communicates with a transformation component 50 which happens to be written in Java. Transformation component 60 further communicates with a service reference provider component 60 which is used to contact the external service provider 30. Service reference component 60 contacts service provider 30 using its transport binding 80. In this instance the transport binding is again JMS.

Figure 1B:
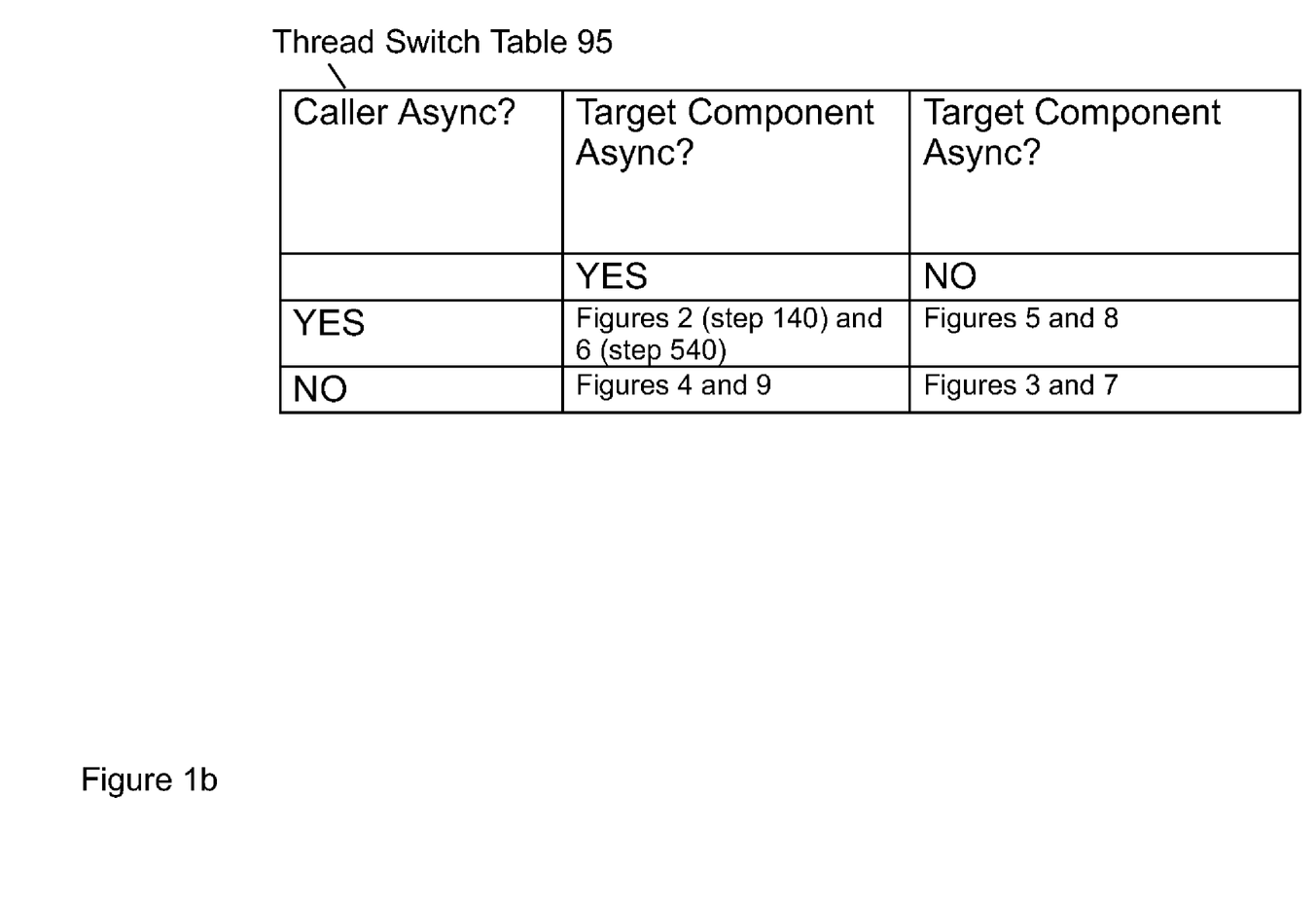
FIG. 1b illustrates the thread switch table of FIG. 1a in more detail.

In order to perform its work, the components of system 10 have access to a pool of threads 90. A thread switch table 95 determines when work should be performed on a new thread. The logic used to decide whether or not to execute work on a new thread is illustrated with reference to FIGS. 2 to 9. FIG. 1b illustrates the thread switch table in more detail and determines which logic processing should be executed dependent upon the circumstances involved.

The processing involved and illustrated with respect to FIGS. 2 to 9 will now be discussed in more detail. As shown at step 100, a service request is received from service requester 20 at component 40 on a running thread. (It is assumed that component 40 will have a thread from thread pool 90 ready to receive such a request.) A decision is then made as to whether to continue processing on this same thread (the current thread) or to switch threads (use a new thread). As indicated previously, asynchronous interactions (and thus thread switches) are far more expensive than synchronous interactions. Whether or not a thread switch is deemed necessary is dependent upon the nature of the calling component and the target component (components 40, 50 in the current example). In other words, whether a component uses a synchronous or asynchronous communication style.

The caller invokes the second (target) component using a particular communication style. It is the transport binding 70 which makes the decision as to what style to use. Such a decision can be made based on the protocol used by the calling component or information in the message received at the calling component. Thus an asynchronous capability may be inherent in the transport (JMS, MQ etc.) or may be enabled via additional addressing information in the message (e.g. SOAP using the WS-Addressing standard). In this example the binding is JMS which does have asynchronous capabilities (i.e. it has the ability to indicate in a request message where a response should be sent to). On the other hand, HTTP is a synchronous protocol and thus a component having an HTTP binding is deemed a synchronous component.

By way of a further example, a component comprising a web services binding may or may not be asynchronous. A web service binding expects to receive SOAP messages and a SOAP message can include a return address. Whether or not a web services binding can take advantage of such a return address and therefore act asynchronously depends on the capabilities of the web services binding itself.

A system runtime (not illustrated) receives the invocation and determines the communication style used at step 110. The runtime then asks the component that the caller component intends to communicate with (e.g. component 50) what communication style it desires to use for the given message. Note, the caller determines its invocation style as discussed above. The invocation style for the caller component is determined from the transport and message (and also from the capabilities of the transport runtime—e.g. if the transport runtime does not support WS-Addressing, then SOAP will always be considered synchronous. Component 50 determines whether it is asynchronous or synchronous according by way of example, to its implementation type or information contained in the message (which was used to request component 50's communication type) that it receives from component 40. By way of example a component might be capable of both asynchronous and synchronous communication. "Information contained within the message" may include the invocation style of the caller. The target component could choose to always act in the same way as the caller. In an alternative, it may decide to be synchronous for small messages and asynchronous for large messages.

In the example depicted in the figure, component 50 has an implementation type of Java. Whether or not a Java component operates asynchronously or synchronously is dependent upon the way in which the component was originally programmed. In any case, it is a known technique to interrogate such a component to determine its communication style.

Thus every externally facing (edge) component (40 and 60 in the example) uses its binding to determine its own communication style. Every internal component (e.g. 50) uses its implementation type to determine its communication style.

Returning to FIG. 2, once a target component has determined its communication style, it returns this to the runtime. The information returned is then used by the runtime to determine whether to continue processing on the current thread or to perform a thread switch.

Figure 2:
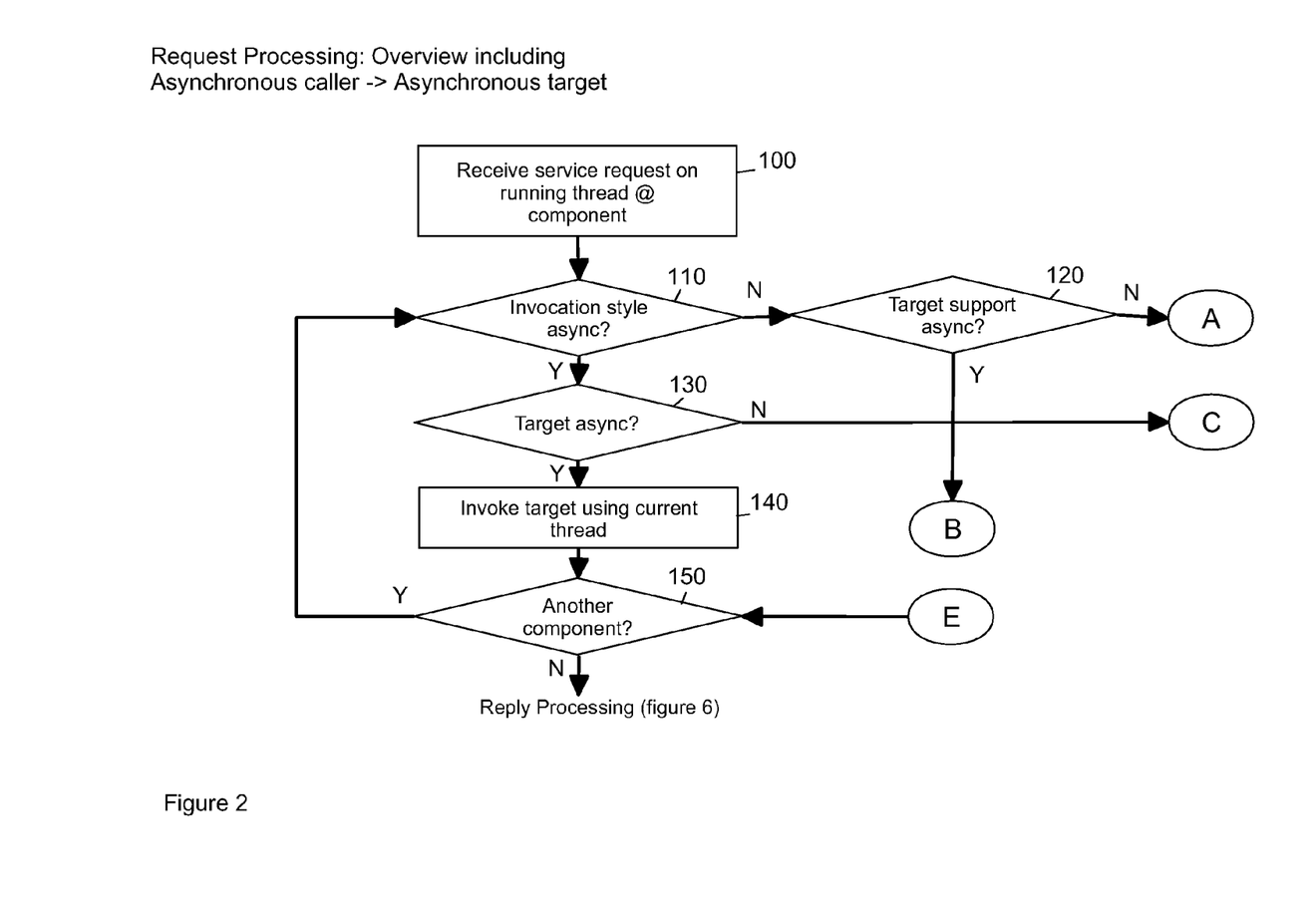
FIGS. 2 to 5 show the request processing of a preferred embodiment of the present invention.
Figure 3:
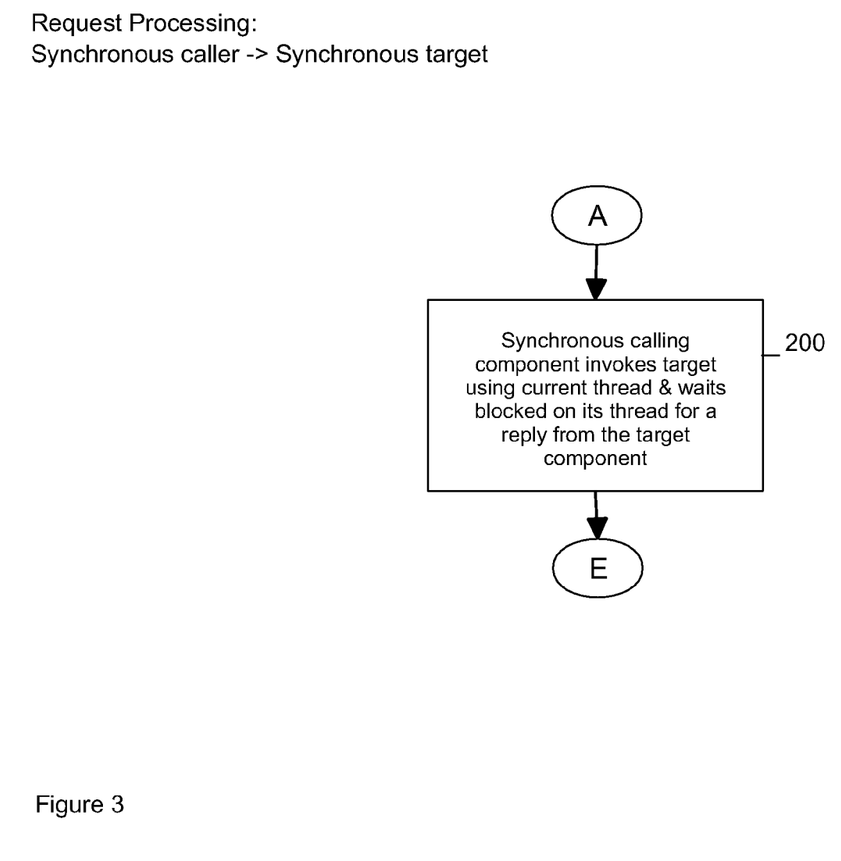

Thus, if it is determined at step 110 that the invocation style used by the caller component is asynchronous and the invocation style which the target desires to use is also asynchronous, then thread switch table 95 (FIG. 1*b*) indicates that the logic of FIG. 2, step 140 should be followed. In other words, the target should be invoked using the current thread—i.e. the thread which received the request. Therefore, for as long as there are asynchronous components chained together, request processing continues on the same thread. This is possible since the current thread is being used to process the asynchronous components' request processing logic. The key thing is that the asynchronous components are expecting to be able to continue their processing "soon" after making their onward invocation—but that there is no absolute time requirement for them to do so. The assumption made is that the chain of asynchronous components' request processing is not too large to be completed relatively quickly. Once the chain is completed (either by going to a transport (i.e. reaching the final component in the chain) or encountering a synchronous component) control is returned to the asynchronous components, to which it is not communicated that the target component's request logic in the meantime has been executed. As soon as a synchronous component is reached, control will be returned to the previous component, for it to complete its request processing, at which time control is then returned to the previous asynchronous component, and so on. The original component is still waiting to get control back. Again, the solution relies on the fact that the request processing chain will complete relatively faster than the overall request-reply interaction. The original calling asynchronous component is not held up waiting for a reply initiated by the service provider which is outside the control of system 10. This is because a reply can be received by asynchronous components on a different thread.

Figure 5:
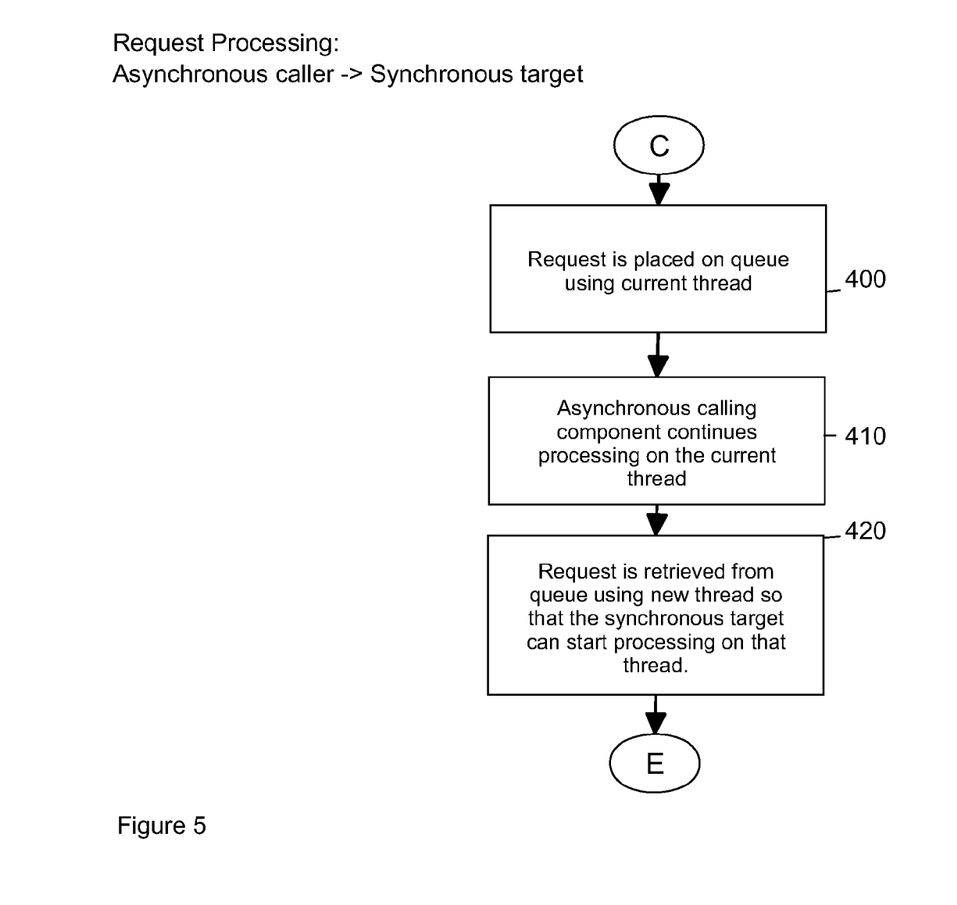

If it is determined at step 110 that the invocation style used was asynchronous and that the target desires to use a synchronous communication style (step 120), then FIG. 2 and also table 1*b* indicates that request processing continues with FIG. 5. The asynchronous calling component does not wish to be held up by the synchronous component. If a direct synchronous interaction is used to communicate with this target, then control will not be returned to the calling component until a reply has been received from the target component. This is because a synchronous interaction expects to use the same thread for the outbound request and the corresponding response. It is preferable not to hold up processing and thus it is desirable for the asynchronous calling component to hand off the request and receive control back immediately. How a response is received is dependent upon the programming model of the asynchronous component. Typically such a component provides a method that the runtime calls with the response message (on some thread other than the request thread).

One possible mechanism to pass on the request and to receive control back is by placing the request on a queue (step 400). Because control is now returned to the asynchronous component, that component can continue any additional processing on the current thread (step 410). The synchronous target component is running a new thread which is waiting for a new message to arrive on the queue. When the message is placed on the queue by the calling component, the message is retrieved by the runtime using that new thread and the synchronous component is then able to start processing it on that thread (step 420).

To explain the foregoing in more detail, the calling component may be a reservation component which is booking a hire car and hotel room. It is written to call the hire car booking component and hotel room booking component asynchronously. In other words, the calling component doesn't want to wait for the hire car booking component to return before continuing to call the hotel room booking component—that is wasting time as the hire car component may take some time to return. So, the current thread (thread 1) is executing the reservation component's logic. The reservation component makes an asynchronous call on the hire car component. The hire car component is determined to be synchronous and so the request is placed on a queue which is available to the hire car component and the reservation component continues processing under thread 1 to book the hotel room. The hire car component processes the hire car request from the queue under a new thread, thread 2.

Once the synchronous component has been invoked processing then returns to FIG. 2, step 150 which determines whether there is a component in the chain for the new calling component to invoke. The calling component invokes the target component and at step 110 the runtime determines that the calling component's invocation style. In this example, the runtime determines that the communications style is synchronous. At step 120 it is determined that the target component is also to be synchronous. FIG. 2 and also FIG. 1b indicates that for synchronous to synchronous processing the logic in FIG. 3 should be followed. Thus at step 200 the synchronous calling component invokes the target using the current thread and this thread is used to execute the target component's logic. The calling component continues its processing on that same thread when the target component invocation returns. When that reply is received processing continues to step 150 of FIG. 2

If it is determined that there is another component in the chain, then processing loops round to step 110 to determine the invocation style of the calling component. In this example, the calling component uses a synchronous invocation. By way of example, it is determined at step 120 the target component desires to use an asynchronous style. FIG. 1b and also the logic of FIG. 4 describes the processing that is to occur in this circumstance.

Figure 4:
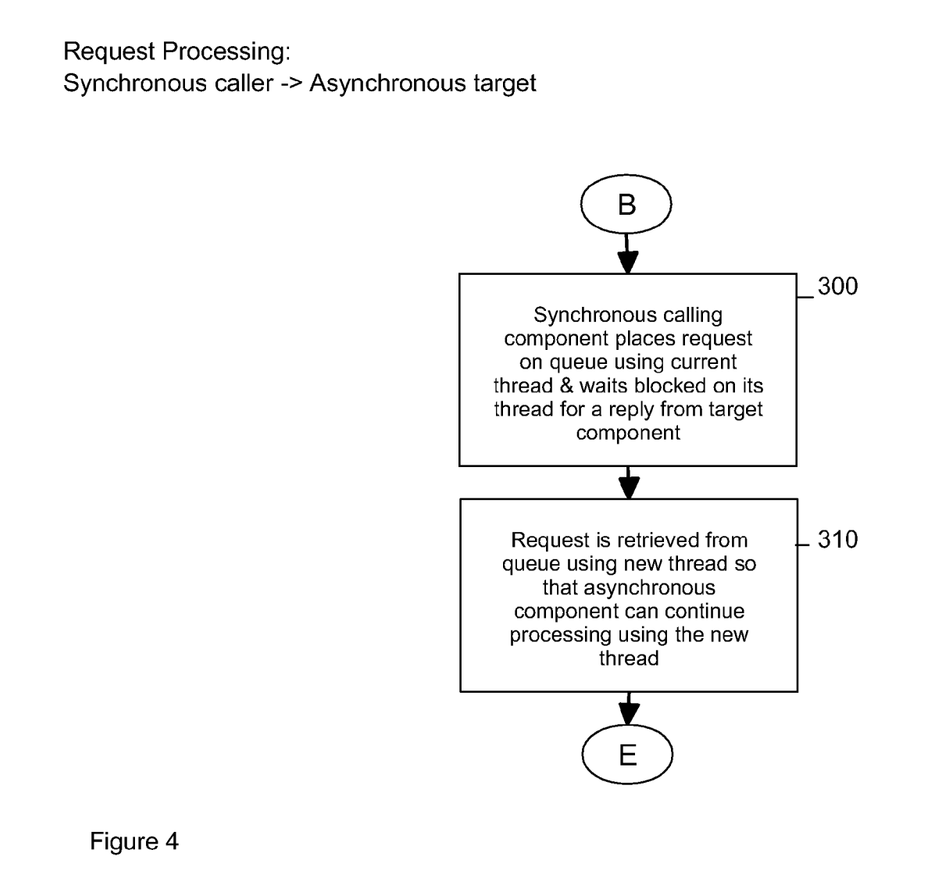

It is necessary for the calling component to remain blocked on its current thread waiting for a reply from the target component without also holding up the asynchronous component's thread. Thus at step 300 the request is placed on a queue using the current thread and the synchronous calling component waits blocked on this thread for a reply from the target component. The request can be retrieved from that same queue using a new thread at step 310 in order to be processed by the target on that new thread. Thus the asynchronous component is free to continue processing independently of the synchronous calling component. Processing then continues to step 150 of FIG. 2 and request processing continues to loop round until there are no more components within system 10. The final system 10 component then makes its request to service provider 30. This is done on the current thread. If the transport is asynchronous, i.e. The final component supports asynchronous communication, then the request thread is released back to the calling component once the request message has been placed into the asynchronous transport (e.g. The request message has been put on a JMS queue). If the final component is synchronous, then the request thread waits for the response from the service provider, then returns that response to the calling component, all on the same thread.

Service provider 30 performs its processing and then returns a reply to system 10. The way in which each component within system 10 processes and forwards on a reply is dependent upon the nature of the components involved. Note, the reply forwarded on at each stage may not be the reply originally sent by a service provider—for example that reply may generate an additional response. An overview of the processing is described with reference to FIG. 6.

Figure 6:
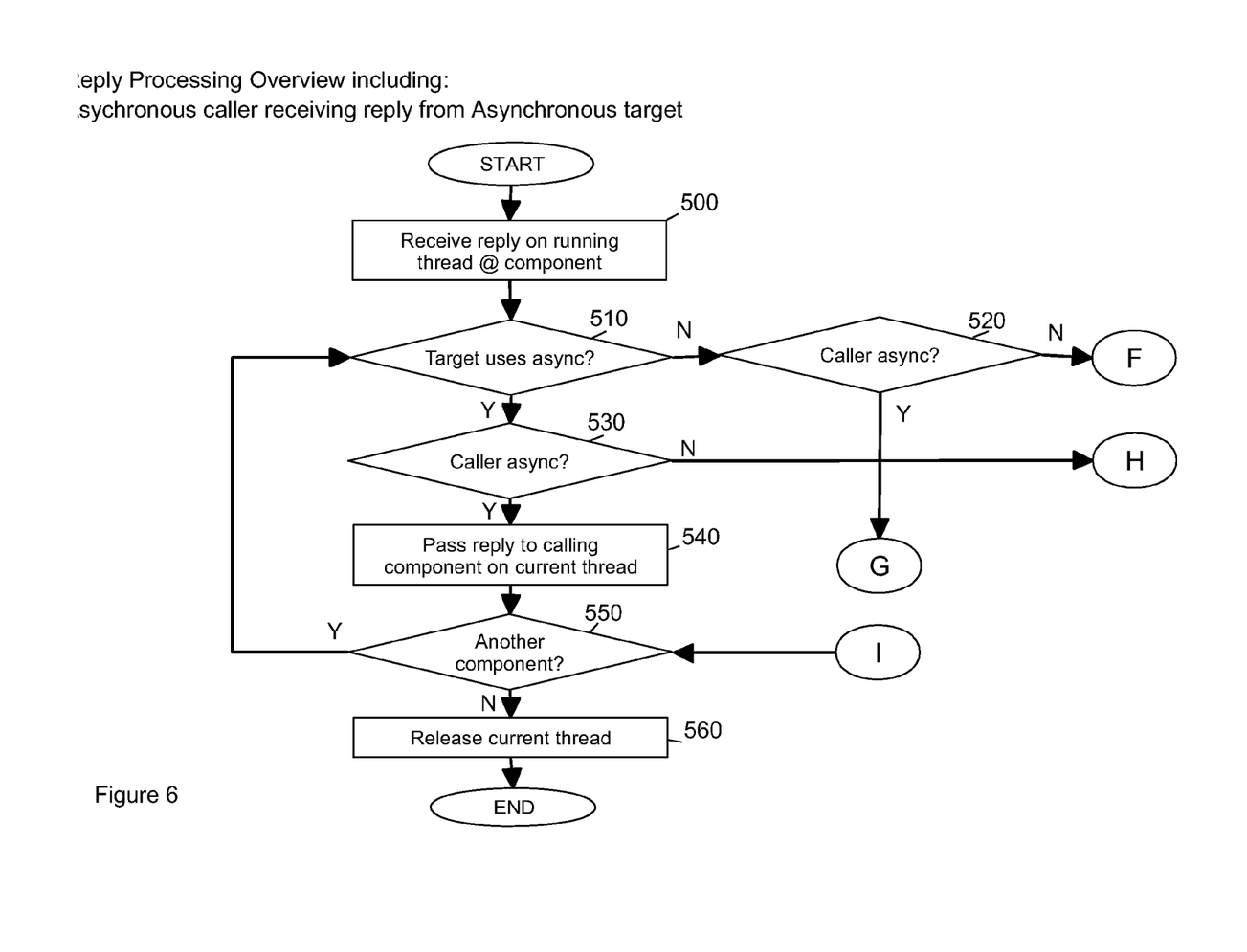
FIGS. 6 to 9 show the reply processing of a preferred embodiment of the present invention.
Figure 7:
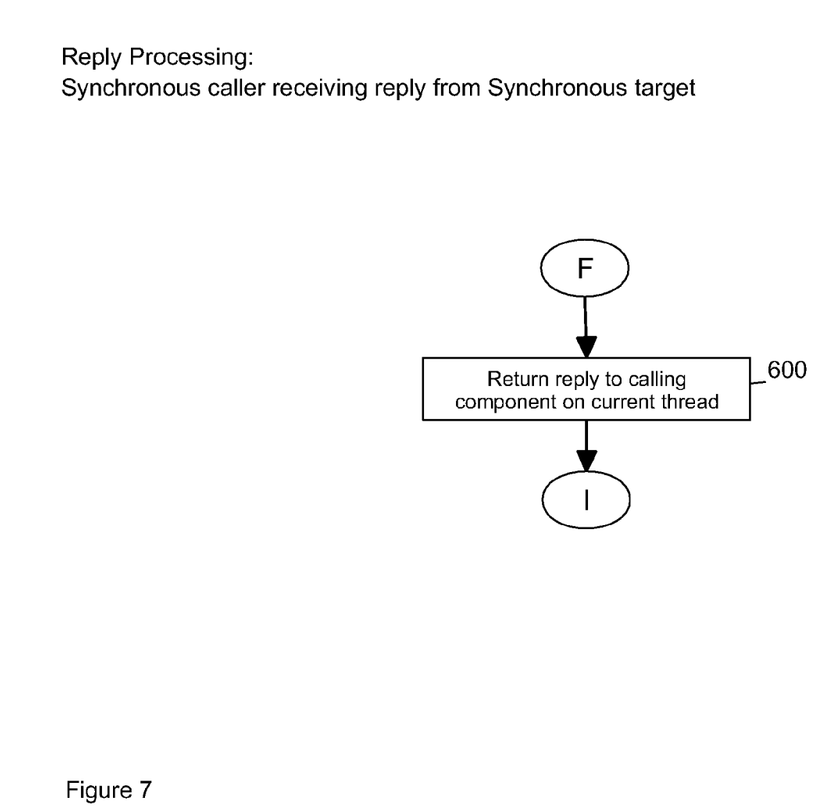

A reply is received from service provider 30 at step 500 on the currently running thread. When the transport is synchronous, the response will be received on the same thread that passed the request to the service provider. When it is asynchronous, the request thread will have been released and the response is received on a new thread. It is then determined how the target invocation is performed at step 510 and whether the caller is asynchronous (step 520 or 530). It should be noted that the target component is passing the reply back to the calling component.

By way of example, it is determined at step 510 that the target used an asynchronous invocation and the calling component is synchronous. In this example FIG. 1b indicates that processing continues with FIG. 9. The reply can be passed straight to the calling component's blocked thread which is resumed (step 800). This is because the synchronous calling component's thread has been blocked waiting for the asynchronous target component to finish its execution. When that happens, the response is handed back to the synchronous calling component, and it continues processing on the previously blocked thread. There's no need to queue the response as the calling component is sitting there waiting for it and will continue as soon as it gets it. The current thread is released (step 810). Processing then continues to FIG. 6, step 550, where it is determined whether there is another component to pass the reply back to.

Assuming there is, it is determined how the target invokes the calling component at step 510 and whether the caller is asynchronous at step 520 or 530. In the example, the next component is synchronous and therefore the interaction is a synchronous to synchronous one. FIG. 1b and also FIG. 6 indicates that processing should continue to FIG. 7. Such logic shows that the reply is returned to calling component on the current thread (step 600). Processing then continues to FIG. 6, step 550, where it is again determined whether there is another component to pass the reply back to.

The next component in the example is asynchronous and in this example the target used a synchronous invocation and thus the interaction is a synchronous to asynchronous one. FIG. 1b and FIG. 6 indicates that the logic of FIG. 8 should be followed. At step 700 the reply is returned on the current thread to the waiting queue (i.e. the one that received the request on its outbound journey). The current thread can then be released at step 710.

Figure 8:
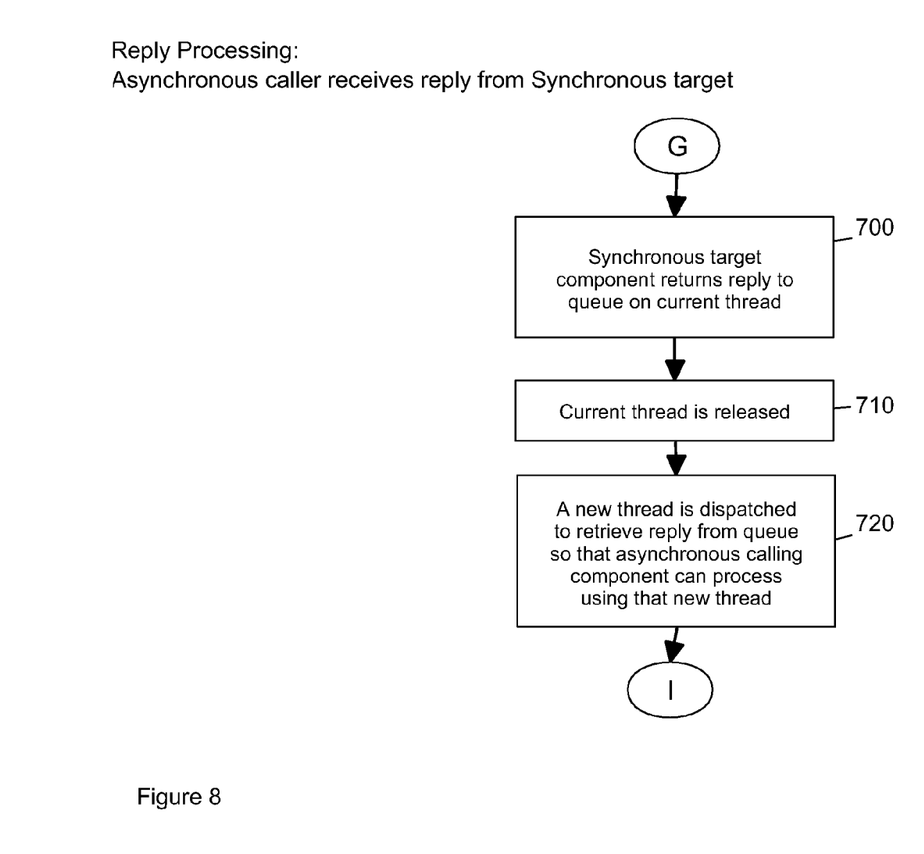
Figure 9:
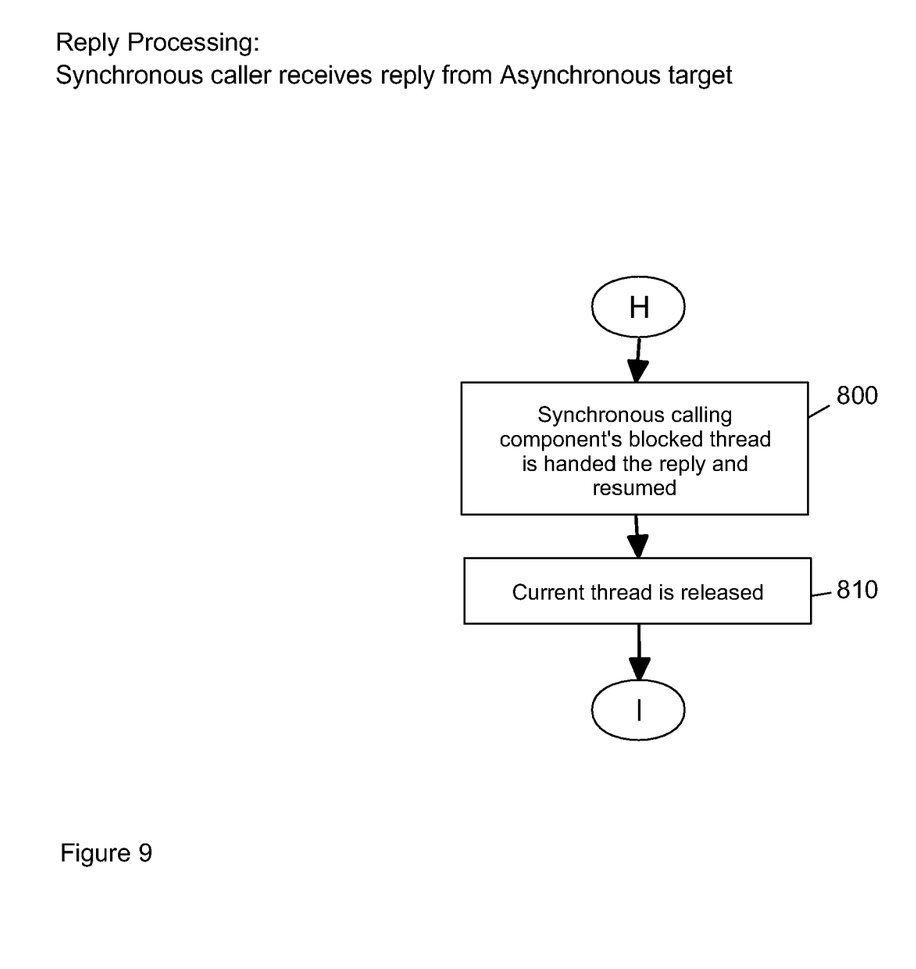

At step 720 a new thread is dispatched to retrieve the reply from the queue so that the asynchronous component can continue processing on that thread. Processing then loops round.

(Note, in some circumstances it may be possible to pass the reply directly back to the thread which invoked the target component in the first place (i.e. avoiding the queue). This may be possible if the calling component has finished its request processing logic and the original thread is not being used for anything else.)

Assuming the next few components in the chain are asynchronous and an asynchronous invocation is used each time by the target component then the reply is passed between components on the current thread (step 540).

Finally a reply is passed back to the original service requester 20. When the reply has been successfully placed into the transport by the current thread (i.e. the reply has been sent from the final component to the requester), the thread has completed processing and returns to the pool ready to receive a new request.

It should be appreciated that once the communication style of the calling component has been discovered on an outbound request interaction, that knowledge is retained for use on the reply interaction.

Thus in a preferred embodiment asynchronous components communicate 'almost' synchronously on an outbound request and yet (unlike true synchronous communication) are able to receive a reply on a different thread from the thread used for the initial request. Again, the reply is returned between asynchronous components in a synchronous manner. A thread switch is only made when a request is communicated between an asynchronous and a synchronous component (irrespective of which is the caller and which is the target) and when a reply is returned from an asynchronous target to a synchronous component. This means that request and reply processing is performed in the most efficient manner possible.

It should be appreciated that the decision logic shown is the minimal logic desirable to determine whether or not to continue processing on the current thread or to perform a thread switch. It is possible for the logic to be somewhat more complex and take into account things like transactionality.

To explain this in more detail:

It may be desirable in some cases for an asynchronous to asynchronous interaction to be done with a transaction boundary between them, so that if the second component fails, its transaction rolls back and its response processing can be retried. With the new behaviour, a failure in the second asynchronous component will result in both asynchronous components' request processing being rolled back and processing restarting from the first asynchronous component. If the first component did lots of work that is unlikely to fail, and the second component does a little work that is more likely to fail, preserving a transaction boundary between the two components might be desirable and this would need a change in the decision logic. This might be achieved, by way of example only, using a queued interaction. An alternative mechanism is to suspend the transaction and start a new one along the same thread. Another example of something that may be taken into account is the execution time of the target component. For instance, for an asynchronous to synchronous communication, if it is known that the synchronous component is going to execute very quickly, then there is no point in queuing the request and using a separate thread. Similarly with an asynchronous to asynchronous communication, if the target component's request processing is very slow, then it might well be better to queue that and use a separate thread. Such information may be based on system administrator knowledge or may be gleaned by monitoring the processing performed by the system over time.

It should be appreciated that the answer a component gives in terms of its calling style will not necessarily be the same as the answer it gives with respect to how that same component can be invoked. It is perfectly possible to have a component that is called asynchronously, but makes synchronous calls on other components. The answer to the question of how a component should be invoked is potentially dependant on information in the current message being processed and thus the answer to the question is preferably not cached; it is asked each time.

While the invention has been described in terms of request/reply invocations, the invention is not limited to such. The invention is intended to encompass situations, for example, where there is a one-way request invocation only.

It should be appreciated that the system 10 includes a runtime component (not illustrated) which is responsible for dispatching new threads, retrieving requests from queues, putting messages onto queues etc. The components themselves are responsible for invoking other components and for determining their own invocation style.

To summarise the preferred embodiment:
1) First component makes its invocation. The style may be governed by the first component's programming model if it is an application component, or by the transport and message content if it is an "edge" component (i.e. the very first or last component).
2) Runtime receives the invocation, and knows what style was used to make it.
3) Runtime asks the second component (or something associated with that component) what style it can receive the given message with.
4) The second component (or something associated with that component) makes the determination based on the programming model, or transport, or some other factor, and returns that to the runtime.
5) The runtime uses the combination of the first components invocation style and the second component's requested style to determine whether a thread switch is required.
6) The runtime makes the switch if necessary and delivers the invocation to the second component on the appropriate thread.

The invention claimed is:

1. A method, in a data processing system having at least one processor, of receiving a message, the message being processable by a component on one of a plurality of processing threads, the method comprising:
   receiving a message from a first component on a current thread;
   determining the communication style that was used by the first component;
   responsive to receipt of the message determining the communication style that is desired to be used by a second component; and
   responsive to determining that the two components are asynchronous, communicating with the second component using the current thread.

2. The method of claim 1, wherein the receiving step comprises:
   receiving a request message from the first component;
   wherein the step of determining the communication style that was used by the first component comprises determining the invocation style of the first component; and
   wherein the step of communicating with the second component using the current thread comprises invoking the second component using the current thread.

3. The method of claim 2 further comprising:
   responsive to determining in a request interaction that one of the components is synchronous while the other is asynchronous, performing a thread switch from the current thread on which the request was received to a new thread by dispatching a new thread to continue processing of the request message.

4. The method of claim 1 further comprising:
   responsive to determining that the two components in a request interaction are synchronous, invoking the second component using the current thread on which the request was received such that logic of the second component is executed on said current thread.

5. The method of claim 1 further comprising:
   responsive to determining that the first component is synchronous and the second component is asynchronous in a request interaction, placing the request on a queue using the current thread on which the request was received, the first component waiting blocked for a reply to be received on that current thread; and
   retrieving the request from the queue using a new thread, for processing by the asynchronous component using that new thread.

6. The method of claim 1 further comprising:
   responsive to determining that the first component is asynchronous and the second component is synchronous, placing the message for a request on a queue using the current thread on which the message was received such that the first component can continue processing the request on that current thread; and
   retrieving the message from the queue using a new thread such that the synchronous second component can start processing the request on that new thread.

7. The method of claim 1, wherein the communication style used by the first component in a request interaction is based on the protocol used by the first component.

8. The method of claim 1, wherein the communication style used by the first component in a request interaction is based on information received in the message at the first component.

9. The method of claim 1, wherein the communication style desired to be used by the second component in a request interaction is based on component implementation information.

10. The method of claim 1, wherein the communication style desired to be used by the second component in a request interaction is based on information received in a message asking for details of the communication style of the second component.

11. The method of claim 1, wherein the receiving step further comprises:
receiving a reply from the first component on the current thread.

12. The method of claim 11 comprising:
responsive to determining that said first component is asynchronous and the second component to which the reply is to be sent is synchronous, performing a thread switch from the current thread on which the reply was received to a new thread by dispatching a new thread to continue processing the reply.

13. The method of claim 11 further comprising:
responsive to determining that the two components in a reply interaction are asynchronous, passing the reply on the current thread on which the reply was received.

14. The method of claim 11 further comprising:
responsive to determining that the two components in a reply interaction are synchronous, passing the reply from the first component to the second component on the current thread on which the reply was received.

15. The method of claim 11 further comprising:
responsive to determining that the first component is synchronous and the second component is asynchronous in a reply interaction, placing the reply on a queue using the current thread on which the reply was received and releasing the current thread; and
dispatching a new thread to retrieve the reply from the queue for processing by the asynchronous second component using that new thread.

16. The method of claim 11 comprising:
responsive to determining that the first component is synchronous and the second component is asynchronous in a reply interaction, and responsive to determining that the thread on which the second component invoked the first component in the corresponding request interaction is available, passing the reply to the second component on the available thread.

17. The method of claim 11 comprising:
responsive to determining that said first component is asynchronous and said second component is synchronous in a reply interaction, resuming a blocked thread of the second component to receive the reply.

18. An apparatus, in a data processing system having at least one processor, for receiving a message, the message being processable by a component on one of a plurality of processing threads, the apparatus comprising:
means for receiving a message from a first component on a current thread;
means for determining the communication style that was used by the first component;
means, responsive to receipt of the message, for determining the communication style that is desired to be used by a second component; and
means, responsive to determining that the two components are asynchronous, for communicating with the second component using the current thread.

19. The apparatus of claim 18, wherein the receiving means comprises:
means for receiving a request message from the first component;
wherein the means for determining the communication style that was used by the first of the message comprises means for determining the invocation style of the first component; and
wherein the means for communicating with the second component using the current thread comprises means for invoking the second component using the current thread.

20. A computer program product in a non-transitory computer readable medium for receiving a message, the message being processable by a component on one of a plurality of processing threads, the computer program product comprising computer instructions operable when run on a computer to perform the steps of:
receiving a message from a first component on a current thread;
determining the communication style that was used by the first component;
responsive to receipt of the message determining the communication style that is desired to be used by a second component; and
responsive to determining that the two components are asynchronous, communicating with the second component using the current thread.

* * * * *